United States Patent
Samid

(10) Patent No.: US 10,541,954 B1
(45) Date of Patent: Jan. 21, 2020

(54) CYBER COMPANION: ATTACHING A SECONDARY MESSAGE TO A PRIMARY ONE

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/505,751

(22) Filed: Jul. 9, 2019

Related U.S. Application Data

(63) Continuation-in-part of application No. 16/228,675, filed on Dec. 20, 2018, now Pat. No. 10,395,053.

(60) Provisional application No. 62/714,735, filed on Aug. 5, 2018, provisional application No. 62/805,369, filed on Feb. 14, 2019, provisional application No. 62/813,281, filed on Mar. 4, 2019, provisional application No. 62/782,301, filed on Dec. 19, 2018, provisional application No. 62/850,720, filed on May 21, 2019, provisional application No. 62/857,898, filed on Jun. 6, 2019.

(51) Int. Cl.
*H04L 12/58* (2006.01)
*H04L 29/06* (2006.01)

(52) U.S. Cl.
CPC .............. *H04L 51/08* (2013.01); *H04L 51/28* (2013.01); *H04L 63/0435* (2013.01); *H04L 63/12* (2013.01)

(58) Field of Classification Search
CPC ..... H04L 51/08; H04L 51/28; H04L 63/0435; H04L 63/12
See application file for complete search history.

(56) References Cited

U.S. PATENT DOCUMENTS

| | | | | |
|---|---|---|---|---|
| 3,701,111 A * | 10/1972 | Cocke | ................. | H03M 7/4025 341/67 |
| 3,755,794 A * | 8/1973 | Stapleford | ................. | G06F 1/03 704/201 |
| 5,034,742 A * | 7/1991 | Bond | ...................... | H03M 7/42 341/106 |
| 5,649,099 A * | 7/1997 | Theimer | ................. | G06F 9/468 709/229 |
| 5,659,616 A * | 8/1997 | Sudia | .................... | G06Q 20/341 705/76 |
| 5,787,175 A * | 7/1998 | Carter | ................. | G06F 21/6209 707/999.008 |
| 6,189,103 B1 * | 2/2001 | Nevarez | ................. | G06F 21/128 726/5 |
| 6,196,466 B1 * | 3/2001 | Schuessler | .............. | H03M 7/08 235/462.1 |
| 7,149,310 B2 * | 12/2006 | Sandhu | ................. | H04L 9/3271 380/278 |
| 8,144,925 B2 * | 3/2012 | Das Gupta | ......... | H04N 1/32261 382/100 |
| 9,912,624 B2 * | 3/2018 | Hunt | .................... | G06F 16/1744 |
| 10,361,980 B2 * | 7/2019 | Hunt | .................... | G06F 16/1744 |
| 2002/0039899 A1 * | 4/2002 | Rossman | .............. | E21B 43/121 455/426.1 |
| 2002/0166049 A1 * | 11/2002 | Sinn | ........................ | G06F 21/33 713/175 |
| 2004/0190635 A1 * | 9/2004 | Ruehle | .................... | H03M 7/40 375/253 |
| 2006/0005013 A1 * | 1/2006 | Huitema | ................. | G06F 21/46 713/162 |
| 2007/0028088 A1 * | 2/2007 | Bayrak | ............... | H04L 63/0428 713/150 |
| 2008/0144728 A1 * | 6/2008 | Ruehle | .................... | H03M 7/40 375/253 |
| 2014/0208059 A1 * | 7/2014 | Kogge | ................ | G06F 12/0692 711/203 |
| 2014/0365779 A1 * | 12/2014 | Brown | .................. | H04L 9/3066 713/176 |
| 2017/0093764 A1 * | 3/2017 | Hunt | .................... | G06F 16/1744 |
| 2018/0109478 A1 * | 4/2018 | Hunt | .................... | G06F 16/1744 |

OTHER PUBLICATIONS

"Variable-bit Huffman encoding tree" (available at https://liucs.net/cs101f13/n2-text.html#fixed-vs.variable-width (Aug. 30, 2019)).*
C.G. Guy, section 1.3.2. "Variable Length Codes", in Data Communication for Engineers (1992).*

* cited by examiner

*Primary Examiner* — Sharon S Lynch

(57) ABSTRACT

Using Unary alphabet to express a cyber message, the identities of the message bits can be used to carry a companion message. The P (prime) message, and the C (companion) message can be related or unrelated. The C message may be used to authenticate, or to invalidate the P message and its writer. While the P message may be in the open, the C message may be limited to key-holding readers. The C message may be modified by successive readers while leaving the P message unchanged. A wide range of applications is available on account of the simple idea of writing the primary message via bit-count (ignoring bit identities), leaving the identity assignments to carry the companion message. Alice and Bob may exchange a large number of primary messages, where for most of them the companion message says: "ignore the primary message". While both Alice and Bob, reading the companion message will regard only the proper messages, an eavesdropper will be thoroughly confused, or receive a misleading impression of the conversation between the two. If the C message is generated via a private key, then a reader of the P+C messages will be able to authenticate the prime message and its writer with the respective public key.

2 Claims, No Drawings

CYBER COMPANION: ATTACHING A SECONDARY MESSAGE TO A PRIMARY ONE

This Application is filed as Continuation in Parts of U.S. patent application Ser. No. 16/228,675.

CROSS REFERENCE TO RELATED APPLICATIONS

This application claims as priority date of:
Provisional Application 62/714,735 filed on Aug. 5, 2018;
Provisional Application 62/782,301 filed on Dec. 19, 2018;
Provisional Application 62/805,369 filed on Feb. 14, 2019;
Provisional Application 62/813,281 filed on Mar. 4, 2019;
Provisional Application 62/782,301 filed on Dec. 19, 2018;
Provisional Application 62/805,369 filed Feb. 14, 2019;
Provisional Application 62/813,281 filed 4 Mar. 2019;
Provisional Application 62/850,720 filed May 21, 2019;
Provisional Application 62/857,898 filed 6 Jun. 2019.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Cyber messaging is vulnerable to fraud and abuse, e.g. "fake news". It is important to devise ways to insure authenticity of messages, as well as ways to modify, qualify, and attribute messages beyond the displayed text. Cryptographic means are elaborate and complicated, and most alarming—may be by-passed. One vies to devise means to address the current vulnerabilities.

BRIEF SUMMARY OF THE INVENTION

This invention describes a method to pack into a single bit sequence two distinct messages, where one can authenticate the other, or modify the other, and add on to the other, details and attributes. One message is read by interpreting the bit sequence in a unary way, namely by bit count—regardless of the identities of the bits, while the other message is read via interpreting the identities of the same bits—the count of which was used in reading the first message. The fact that both messages are written in the same sequence of bits (same message pack) can be exploited in a variety of applications.

DETAILED DESCRIPTION OF THE INVENTION

U.S. patent application Ser. No. 16/228,675 describes in detail principles and the mechanism to express any bit-wise message in the unary way where the count of bits, not the identities thereof, is used to express the message. This leaves the bit identities free for expressing a companion message. These principles are repeated and enhanced herein. The combined message pack then carries both the primary message, P, and the companion message, C. {P+C}. The salient feature of this way of writing is that C does not follow P, nor is it attached to P, but it is inherently part of the package. Yet—C can be modified without changing P, and P can be modified without changing C.

The many applications of this feature may be exemplified by:

1. Passing two independent messages 2. Modifying, and characterizing the Primary message with the Companion message 3. Message and writer's authentication 4. Tracking readership of the primary message We define here a few basic concepts: A unary message is constructed via a series of positive integers, where each integer represents a letter from an agreed upon alphabet. E.g.: message m=3, 12, 9, 5 . . . . These numbers represent count of bits. In the above example: m={3 bits} {12 bits}{9 bits}{5 bits}. It is necessary to distinguish between one letter and the next. This can be done by using two bit representation of a single bit (double bit method). (It can also be done by using other methods, as discussed ahead. In the double-bit method one double bit representation is used for the bit count and the other for delimiting the boundary from one letter to the other. We call the first representation "unary', U, and the delimiting bits we regard as the delimiting representation, D. We may express "0" in the unary method as "01" and "1" in the unary method as "10". We will express "0" in the delimiting method as "00", and "1" in the delimiting method as "11".

$0_u=01$; $1_u=10$ $0_d=00$; $1_d=11$

We may agree that any message P will be written as $0_d\text{-}|P_1|\text{-}1_d\text{-}|P_2|\text{-}1_d\text{-}|P_3|\text{—} \ldots 0_d$ where $P_1$ is letter i of message P, and $|P_i|$ is the bit count that represents the letter $P_i$.

Accordingly, the example above will be written:
m=000101011101010101010101010101010111010101
01010101010111010101010100

In this example the unary bits (29=3+12+9+5) were all written as $0_u$. The message P will read the same, regardless of identities of these 29 bits. Namely, it is possible to write $2^{29}$ companion messages to P by using various identity combinations for these 29 bits.

A more rigorous presentation in the next section.

Passing Two Independent Messages

The primary and companion messages may be completely independent, with no content connection between them. The pack simply delivers two messages within a one pack.

The reason for building the pack may be 1. addressing two or more classes of readers with the same message pack 2. separating the important from the less important.

P may be addressed to one class of readers who will not be able to read C. It may be because the alphabet is not clear to them or because C was encrypted. The message pack will address another class of readers who would read P and also read C.

P may contain the important elements of the pack, while C contains some less important details. A reader will be first exposed to the primary message P, and only if interested will be able to extract from the pack the less important part, the companion message C. It fits well because C is by its structure more compact bit-wise than P, so the same number of reading bits will carry a smaller P message and a larger C message.

Since in this mode P and C are independent messages, they can independently be encrypted before forming the message pack. The message pack can be encrypted after it is being formed.

Applications with Relationship Between the Primary and the Companion Messages

The primary and the companion messages may be related to each other. Several options:
1. One message modifies the other.
2. Covert Messaging
3. Cryptographic Confusion One Message Modifies the Other The primary and the companion messages may modify and qualify each other. It is more 'natural' for the companion to modify the primacy but it can go either way.

Options:
1. confidence measures 2. elaboration notes

The companion message may be used to deliver measures of confidence in the veracity of the message carried by the primary form.

There are various ways for such confidence use. Consider a message M comprised of four parts $m_1$, $m_2$, $m_3$, $m_4$. Message $m_1$ and $m_3$ are stated with high confidence. Message $m_2$ is stated with low confidence, and message $m_4$ is clearly false. The sender would construct four primary messages $p_1$, $p_2$, $p_3$, $p_4$ respectively, and prepare four companion messages: $c_1$="high confidence message", $c_2$="low confidence message" and $c_3$="high confidence message" and $c_4$="this message is false".

Elaboration notes may harbor detailed explanation or indication of authorship, time stamp, etc.

Covert Messaging

The companion message may be intended as a covert mode. A reader of P not aware of the alphabet used for C may not suspect the existence of the companion message. It would be delivered covertly to those who know. If C is encrypted before it is made a companion message then the bit identities may seem randomly selected, further reducing the suspicion for the expense of the companion message.

A series of primary messages $\pi_1$, $\pi_2$, ..., $\pi_u$ may be written such that the identities of the bits used in writing the primary messages are well randomized, except for message $\pi_v$ which carries a companion message C which is pre-encrypted so its bits structure also looks well randomized. The reader who knows the key used to encrypt C (or knows the respective decryption key) will see that all companion messages except the one that is written for $\pi_v$ are 'garbage'. But the companion message for $\pi_v$ carries a message. A cryptanalyst will see u randomized sequences of bits and will have to spend cryptanalytic efforts to crack all u messages, not knowing that only one of them carries a meaning.

Encrypting the companion message combines stenographic methods (covert writing) with nominal cryptography (overt writing). All the methods available for cryptographic aims can be used within this message pack method. For example the BitFlip cipher (Application #16253911) will build a cryptogram that will be interpreted to different plaintexts by different readers. That cryptogram can be used as a companion message to any innocent looking primary message.

Cryptographic Confusion

One could write a long primary message P that is replete with statements and their counter statements or in general combine a set that are mutual inconsistent. The companion messages attached to each of those messages will covertly indicate which primary message section to regard and which to disregard.

Message and Writer's Authentication

The companion message C can be used to authenticate the primary message P, and its writer. There are two modes:
1. symmetric authentication 2. asymmetric authentication The authentication task needs to be carefully designed to combat the fraud of "replay". A primary message P can be properly associated with a companion message C. Later on a fraudster will send P within different circumstances using the same (now exposed C) and claim that it was sent by the sender who has the secret key to generate C.

To meet this challenge it is important not to apply the authentication to very short (reusable) statements, add a date, time, or a nonce to P, so it cannot be used "as is" in a fraudulent manner, and also to choose the algorithm that generates C from P in a way where even a single letter change in P will result in a big change in the C. Such is the property of hashing. The fact that P is written in the unary mode means that C is per information contents longer than P, and one would naturally use a cipher where the ciphertext is larger than the plaintext. As is the case with U.S. Pat. No. 6,823,068.

Symmetric Authentication

A group of two ore more mutually trusting correspondents may each know each other's secret key, may send messages to each other using each their key to generate the companion message for their primary message, and thereby authenticate themselves in protection against an outsider falsifying their primary messages.

The group can use a single key, to protect against outside of the group fraud, or each member of the group may've his or her own key to be identified as the author of the message.

This method can be applied in the opposite mode, where the companion message is the 'upfront' displayed message the primary message is the authentication code.

This authentication may be applied to an evolving document. Group member $g_1$ writes message $p_1$, and signs it with companion message $c_1$. $C_1$ is generated by encrypting $p_1$ with $k_1$ which is the key used by group member $g_1$. The message pack $\{p_1$ - - - $c_1\}$ is then distributed within the group. All members of the group will read $p_1$, and will be able to verify that $c_1$ is the product of encrypting $p_1$ with $k_1$, which they all know is the key used by group member $g_1$. Group member $g_2$ may which to add some words to $p_1$. He does so with a primary message $p_2$. $g_2$ will then encrypt $p_2$ with $k_2$ to generate $c_2$ which he would then attach as a companion to $p_2$. The combined pack: $\{\{p_1\text{-}c_1\}, \{p_2\text{-}c_2\}\}$ will then be distributed within the group. The group will verify that $p_2$ was written by $g_2$ because the group members know $k_2$.

And so on, the group members will each add to the evolving document. And each primary message add on will be accompanied by the companion message that would authenticate both its writer and the integrity of the message. The companion message can also convert a time stamp, of when a primary section was added. These time stamps will allow one to trace the evolution of the combined document as written in the primary message. The record will show who added what when.

When a document is evolving it also incurs revision and deletions. Such deletions and older version of some text can all be assembled as an appendix or otherwise in a clearly marked section of the primary text, and each deletion or replaced version will have in companion format the indication of who removed it and when, and may be even for what reason.

It is possible to replace the encryption procedure with a key based hashing procedure.

Asymmetric Authentication

We consider a public/private asymmetric cipher where an input x processed with a private key $k_r$, generates an output y, which when processed with a respective public key, $k_u$, will yield back x. There are several well known cryptographic formulas that accomplish this procedure, and in addition are such where the value of the private key, $k_r$ is very difficult to infer from the public key $k_u$.

Deploying such an asymmetric cipher, the sender will use the primary message P as the x input x=P, in conjunction with its private key $k_u$, to produce the output y, which will become the secondary message C. The pack {P-C}, then will carry the message P with C as its authenticator data. The recipient, aware of the sender's public key, $K_u$, will process y through this public key and compute x. If x=P the recipient is assured that the primary message P was written by the sender in possession of the private key $k_r$, corresponding to the known public key, $k_u$.

It is possible first to hash P and then encrypt the hash.

Tracking Readership of the Primary Message

We consider n correspondents each possessing a key: $k_1$, $k_2$, ..., $k_n$. Correspondent 1 writes a message P, and authenticates it with its companion $C_1=f(P, k_1)$. The {P-C} pack is sent to correspondent 2, which computes its own companion version $C_2=f(P, k_2)$. Correspondent 2 then XORs the two versions:

$$C_{12}=C_1 \oplus C_2$$

and then correspondent 2 sends the primary message P with $C_{12}$ as companion to correspondent 3.

Correspondent 3 behaves respectively, computes $C_3=f(P, k_3)$, and sends to correspondent 4 the message P with companion: $C_{123}=C_{12} \oplus C_3$. It so continues, until correspondent n who sends P back to the writer of P, correspondent 1, with the companion:

$$C_{123\ldots n}=C_1 \oplus C_2 \oplus \ldots C_n$$

Which serves as proof that all the correspondents have read message P.

This tracking procedure will work with symmetric and with asymmetric keys.

This basic scheme can be modified for "live messaging" where correspondents add notes, and comments to the primary message P.

We recall that the bit counts of all the companion messages is the same as the bit count of P:

$$|L_P|=|C_1|=|C_2|=\ldots |C_n|$$

The result $C_{123\ldots n}$ is the same regardless of the order in which the message passes through the n readers.

This companion message signing may be extended to add a time stamp and other information.

Evolving Group Document Management

We consider the case where a group of n members participate in writing and reading a joint document, with many parts. In some cases tt is important to insure that all members, read all parts of the document, to be on the same page. In other cases some hierarchy is established where privileged members read more parts than less privileged members. Both cases can be handled with this cyber companion methodology.

We address evolving document management via:
1. Group Sharing 2. Group Hierarchy Group Sharing Evolving Document Management We consider the case where correspondent 1 writes primary message $P_1$ and passes it to correspondent 2. Correspondent 2 will add some primary message notes, $P_2$, and passes the combined primary message $P_{12}=P_1+P_2$ to correspondent 3, which will add $P_3$, and so on to create a combined $P=P_1+P_2 \ldots P_n$. (note: the sign "+" represents concatenation).

To track and authenticate these messages, correspondent 1 will send $P_1$ to correspondent 2 with $C_1=f(P_1, k_1)$ as companion message. Correspondent 2 will add $P_2$, and generates companion $C_2=f((P_1+P_2), k_2)$. Clearly $|C_2|>|C_1|$, so we can write:

$$C_2=C_2'+\Delta C_2$$

where the $\Delta C_2$ represents the add on of $C_2$ over $C_1$, and $|C_2'|=|C_1|$. Correspondent 2 will then XOR $C_1$ and $C_2'$:

$$C_{12}'=C_2' \oplus C_1$$

and concatenate $C_{12}'$ with $\Delta C_2$ to create $C_{12}$ to be written as the companion of $P_1+P_2$ and sent to correspondent 3:

$$C_{12}=C_{12}'+\Delta C_2$$

And similarly for correspondent 3 who will add $P_3$ to the primary message, compute $C_3$ based on her key $k_3$, and xor the bits of $C_3'$ which fit into the size of $C_{12}$, then concatenate the xor results with the extra bits from $C_3$ to create $C_{123}$.

And so on until correspondent n, where the result is sent back to correspondent 1. The total message then will have evidence of who read (or wrote) which part. The combined message may be re-routed through the n correspondents until no new add on primary notes appear. The round after that is the round where the final combined message P has been read (and presumably agreed to) by all n correspondents.

Because of the xor process this procedure can be carried out in various orders.

The composing of the companion messages can be done over all the existing primary messages of various writers, or per primary message of each writer.

We chart below the sequence of an evolving document written by n=5 participants. Member 1 writes P1, passes to member 2 who adds part P2, and so on. The column shows the order of time from top to down as the evolving document moves from member 1 to member 2 up to member 5. The letter "W" signifies the stage where each member adds its part.

| | NO COMPANION | | | |
|---|---|---|---|---|
| | | Evolving Document | | |
| | P1 | P2 | P3 | P4 | P5 |
| 1 | W | | | | |
| 2 | | W | | | |
| 3 | | | W | | |
| 4 | | | | W | |
| 5 | | | | | W |

The chart below shows the same sequence but with use of the cyber companion methodology. Each group member in turn reads all the parts of the evolving document written beforehand, and signs each section by computing its own companion then XORing it with the previous companion message—the result is indicated by the letter R (read). When the evolving document reaches member 5, it is passed again through members 1, 2, 3, 4 so all members can read all the parts of the document. The chart shows how any part of the document P1, P2, P3, P4, P5 is associated with a respective XOR summary of all the companion messages: C1, C2, C3, C4, C5 which can be checked that it really represents the XOR of the writer and all readers. The chart shows the progress in time of the evolving document through members: 1, 2, 3, 4, 5, 1, 2, 3, 4, 5.

| GROUP SHARING | | | | | |
|---|---|---|---|---|---|
| | Evolving Document | | | | |
| | P1 | P2 | P3 | P4 | P5 |
| 1 | W | | | | |
| 2 | R | W | | | |
| 3 | R | R | W | | |
| 4 | R | R | R | W | |
| 5 | R | R | R | R | W |
| 1 | | R | R | R | R |
| 2 | | | R | R | R |
| 3 | | | | R | R |
| 4 | | | | | R |
| 5 | | | | | |
| : | C1 | C2 | C3 | C4 | C5 |

At the end of the process message P1 will have a companion message C1 creating a message pack {P1-C1} and similarly for {C2-P2}, {P3-C3}, {P4-C4}, {P5-C5}.

Group Hierarchy Evolving Document Management

In the group hierarchy mode the evolving document is passed from the low privilege participants to the high privilege participants. Each reader adds the companion message to what was written beforehand, and the evolving document does not circle back.

The chart below presents the case above with a group of 5 participants in a hierarchy mode. The XOR summary of the companions is used to check that the document was properly read. Group member 2 does not read what group members 3, 4, and 5 are writing—because he is of low privilege. Group member 3 does not read what group member 4 and 5 were adding to the evolving document.

| GROUP SHARING | | | | | |
|---|---|---|---|---|---|
| | Evolving Document | | | | |
| | P1 | P2 | P3 | P4 | P5 |
| 1 | W | | | | |
| 2 | R | W | | | |
| 3 | R | R | W | | |
| 4 | R | R | R | W | |
| 5 | R | R | R | R | W |
| | C1 | C2 | C3 | C4 | C5 |

Key Management

The keys which the members use for generating the companion messages may be symmetric or asymmetric; may be shared knowledge, or may be hub-knowledge. In the former mode all group members know all the keys of all members. In the latter mode there is one management hub that knows the keys of all members. The hub then is the only one who can check the XOR summary to see it represents all the due readers and the indicated writer.

It is possible to implement this method with a separate key for writers and a separate key for readers.

Multiple Path Tracking

So Far we discussed an evolving document taking a single path though the group. In practice it may happen than member 1 writes part P1 and sends it to member 2 and member 3 (or more) in parallel. Each document is then assuming its own path which may cross. This may lead to some chaos, but nonetheless each path is fully tracked by the succession of companion messages XORING into the summary companion message for each primary message.

Readers who get another copy of an evolving document may either re-sign it with their add on companion or pass it as is. Which option they choose should be clearly indicated so that the XORed companion message can be properly evaluated.

Network Document Tracking

Unlike in group tracking, in a network there is no closed list of participants. As long as all the readers identify themselves and there is some management agent who knows the keys used by readers, the summary companion message can be checked to see that it reflects the list of readers.

Payment Management

Payment within a loose network of traders is a process that may require tracking for accounting purposes. The companion message methodology can be deployed. A digital coin will carry its own chain of custody as part of its digital trail. This digital trail can be signed with a companion by any passing custodian of the coin.

Let a digital coin D be issued by a mint. The face value and terms of D are expressed as a primary message $D_p$. The coin is minted by a mint. The mint then passes the coin to trader T1. The face value of the coin states its value, and terms associated with it, and the fact that it was passed by the mint to trader T1. All this information represents the 'status' of the coin and is written as a primary message $P_1$. The mint then is signing the coin with it private key generating a companion message $C_1=f(k_{mint}, P_1)$, where $k_{mint}$ is the private key of the mint.

Trader T1 will now XOR the companion message written by the mint with its own. The part of the primary message added by trader T1 will be added by the companion message written by trader 1.

When trader T1 is passing the coin, (or part thereof) to trader T2, trader T1 adds to the digital trail of the coin the fact that it was paid to trader T2. Trader 1 may add a time stamp for the transactions, and even identify perhaps what it was paid for. The coin is now longer (in bit count). All its information is now written as primary message, $P_2$. Trader 1 then uses her private key $k_1$ to compute a companion message $C_2$ for the coin: $C_2=f(k_1, P_2)$, and passes the coin as a message pack {$P_2$-$C_2$} to trader 3.

The parts of the primary message of the coin that were written before the current trader have a companion message which is XORed with the new companion message added by the current trader.

The sequence that happened for passing the coin from trader T1 to trader T2 is now being repeated when transferring the coin to trader T3, and on. The coin is getting larger (longer in bit count) as it carries in its trailer the full history of its custodians. The original part of the coin as minted (coin id, value, terms etc.) is written with a companion message that is the XOR result of all the companion messages from the mint and thorough the list of all the traders so far. The part added by trader T1 will carry the companion message which is the XOR of trader T1 through the current trader (going through all the traders so far). And so for the part added by trader $T_i$ it is written with a companion message that is the XOR of the companion message written by $T_i$, and $T_{i+1}$, $T_{i+2}$, until the current trader.

This methodology can be applied with symmetric or asymmetric keys. Using symmetric keys the mint or any trust agent will know all the keys and authenticate the chain of custody. Using asymmetric keys, then the chain of custody transfers will have to be each signed (written with companion message) by the passing trade with no XORin on top of it. The trader to which the coin is passed will check the validity of the primary message that says this coin is passed from the passing trader to the evaluating (latest) trader, and then check if the passing trader got the coin properly from the previous trader, and so backwards. The passing information: $\{T1 \rightarrow T2\}$, $\{T2 \rightarrow T3\}$, ... $\{T(n-1) \rightarrow Tn\}$, will be written with companions by the passers. Trader i passing to trader (i+1) will write a companion to the message that says $\{Ti \rightarrow T(i+1)\}$, which any future custodian will be able to verify provided the public version of the key used by trader i is well published. So each prospective trader will be able to check back and authenticate the full chain of custody of the coin.

In summary: All the traders in the network will have their public keys $k'_1$, $k'_2$, ... well published. This will allow a new payee of the coin to check the validity and authenticity of the coin which the current custodian tries to pass to him. The current companion messages of all the parts of the growing coin will be evaluated backwards to authenticate the respective claims in the primary language.

After validating the coin history through its current companion the prospective payee will have confidence in accepting it.

This payment management methodology is similar to the hierarchy option for evolving document management. The coin so managed is growing in size. But this can be at any point stopped by redeeming the coin against a new coin of same value, but one freshly minted and without the long chain of custody.

The big challenge in digital payment is 'double spending'. This challenge can be handled first by redeeming coins before they generate a larger chain of custody. The shorter the chain the less the chance for fraud. If trader Ti did a "double spending" then from him on, there is a two branch setup with each of the double spent coins generating an ever growing branch. Each branch looks bona fide to each prospective trader accepting one of the two coins. No trader can discover the double spending. Eventually the two coins are submitted for redemption. When the first double coin is submitted it looks OK, but when the second coin comes for redemption then the mint knows that double spending occurs.

The mint then will trace back the custody chains of the two coins and inevitably find out that Ti is the double spending trader. Once the culprit is identified, it can be held accountable. This can happen in several ways: 1. invoicing the trader for the double spent coin, 2. legal consequences, 3. loss of the trust index that trader accumulated and on which basis the next trader agreed to receive a payment form him without real time checking its validity with the mint. Insurance also can play a role.

BitMint Payment Management

BitMint is a payment system described in U.S. Pat. No. 8,229,859 also known as the BitMint system. Accordingly a set of traders register with the mint, and each trader shares a secret key with the mint.

The BitMint mint would write the mint-id and the coin-id in primary language, then 'sign' it with a companion language. The signing will be done with the secret key of the mint. The BitMint mint that issues the coin will identify the id of the registered trader as the one receiving the coin. The companion message will be the encrypted result of private key of the mint encrypting the mint id, the coin id, and the id of the recipient of the coin.

When the first recipient of the coin will pass it to the next trader, the first trader will compose a bit string to represent the mint id, the coin-in and the id of the 2nd trader to whom the coin is being passed. This will be done with the secret key of the first trader (which he shares with the mint). The result of this computation will be XORed with the present signature (companion message) of the coin. So it will continue with respect to the 2nd trader passing the coin to the 3rd trader, and so on. The coin itself will carry the chain of custody.

When the coin is finally submitted for redemption the mint will check the declared chain of custody against the current signature of the coin (namely the companion message of the mint-id, the coin-id and the ids of the trader submitting the coin for redemption). Since the BitMint mint knows all the secret keys of the traders in the chain of custody, the mint can then compute the various signatures, XOR them and verify that the current companion message of the coin forwarded for redemption is consistent with the chain of custody.

If the test fail the mint will check with all the traders identified in the chain of custody to pin point the problem.

Preparing a Companion Message

Let P and C be two arbitrary messages.

Let us write P in a unary fashion. We use an alphabet A comprised of $|A|=a$ letters. We write each letter i of A by a string of $t*i$ bits, where $i=1, 2, \ldots a$, and t is an agreed upon fixed positive integer. The message P is comprised of p letters, where each letter is one letter from alphabet A.

In the previous section we normally used $t=1$ but this is a special case. With $t=1$ a statement combining one letter representing 3 bits and another letter represented 5 bits will look like 10001000001, with $t=2$ it will look like: 10000001000000000001.

The letters in alphabet A are $\alpha_1, \alpha_2, \ldots \alpha_a$. Letter $\alpha_i$ in this alphabet is represented by ti bits. The letters are recognized by their bit count, not by their bit identity. The letters are separated by a 'letter separating symbol'. The separating symbol guides a reader of the message to properly interpret every letter j in the sequence of letters $P_1, P_2, \ldots P_j, \ldots P_p$ that comprise the message P by the bit count (identified through the letter separators). If letter $P_j$ happens to be letter $\alpha_i$ in alphabet A, then the reader will identify it by the count to $t*i$ bits.

We may agree that the letter separator symbol will start and end every message P, and will be placed between every two letters in P. So every letter in P will bounded by two letter separating symbols, allowing for an easy count of the bits—while disregarding the identities of those bits.

The letter separator symbol can be implemented in various ways, as will be discussed ahead. But the method of recognizing the start and end of a letter is independent of the writing method presented herein.

On average the size of the letters in message P is about ta/2 bits (depends on the frequency of the various letters).

We define the bit length, or 'length' of P ($L_P$) as the count of bits of all the letters that comprise P.

$$L_p = \Sigma |P_i|, \ldots i=1, 2, \ldots p$$

where $|P_i|$ is the length of letter i in message P. If letter $P_i$ is represented by letter $\alpha_j$, then it would be written by a sequence of $t*j$ bits. The identity of $a_j$ will be determined by that count (t*j), bound between two letter separator symbols. This reading of letter $\alpha_j$ is carried out regardless of the binary identity of these t*j bits.

$L_p$ is approximately (ta/2)p bits long.

Let us write message C in an alphabet B of size $|B|=b=2^d$. (b and d are positive integers). We write message C as a sequence of c letters $C_1, C_2, \ldots C_c$ that are all in the form of a string of d bits each, and each letter of B is represented by a particular bit string of size d. c=|C| is the size of message C in letters (written in alphabet B). The bit size of C will be cd. We define the bit size of C as its 'bit length or length' cd=$L_c$.

Unlike the way we wrote message P (the unary way), where the identities of the bits played no role in interpreting the message (only the bit count mattered), we write message C with full regard to the identities of the bits. Thereby we can write every letter in alphabet B as a bit string of size d bits, and have the capacity to express $2^d$ letters.

The fact that in writing P the identities of the bits play no role, but in writing message C, the identities play the key role, is the foundational fact for the method presented herein. It enables one to write a single string of symbols and have it interpreted once as a P type message and once as a C type message, where P and C may be related or not.

We designate message P as the "Primary message", and we designate message C as the "Companion" message to P.

The procedure to write a single sequence of symbols that would be interpreted as both P and C (both primary and companion messages) requires a distinct symbol for the letter separation function (to read P). These symbols are ignored by the reader who interprets the single sequence as the companion message.

We regard the single sequence of symbols that comprises both the primary and the companion message as the "P+C message pack" or simply "the message pack".

We analyze the three options: $L_p=L_c$, $L_p<L_c$, $L_p>L_c$

In the case of: $L_p=L_c$, the writer may start with writing message P, resulting in $L_p$ bits (other than the letters separation symbols). The identities of these $L_p$ bits will be adjusted so that a reader of message C (of length $L_p=L_c$) will read in the message pack the companion message C, The writer may also start with writing the companion message, C, which will result in a bit sequence of $L_c=L_p$ bits. The writer of the primary message P will then separate off these $L_c$ bits and place letter separator symbols between the separated substrings, such that a reader of P will interpret P correctly.

In summary the P+C message pack may be written as first P then "dress upon it" message C by setting the identities of the bits properly, or the pack may be written by first writing the companion message C and then breaking apart the $L_c$ bits so that the primary message P can be properly read.

In the event that the bit counts of P and C is different: $L_p \neq L_c$, then the shorter message (in bit count) will have to be "padded" to achieve the condition of $L_c=L_p$.

Ahead we discuss: (i) message padding, (ii) letter separation techniques.

Message Padding

We discuss the task to pad a smaller message M', to be of the same bit count as a bigger me message, M: |M|>|M'|.

Options 1. end of message symbol 2. repeat last letter 3. full message repeat 4. pre-agreed void message 5. self voiding text End of Message Symbol One designates one letter or a combination of letters from the alphabet in which M' (the smaller message) is written, as dedicated for the function of 'end of message symbol'. We denote this symbol as '*'. One would then write message M' mindful of the need to avoid using the symbols '*' in the writing of M'. When M' is fully written, one concatenates to its end the symbol '*', and then follows by a meaningless message M" of length |M"|, where |M"| is adjusted to insure that:

$$|M|=|M'|+|*|+|M''|$$

This will transform message M' which was shorter than M (in bit count) to become message M'''=M' ||*|| M" (where || represents concatenation) which is as long as M: |M|=|M'''|.

This method may need some further adjustment. The reason is that companion message C is written by adding d bits at a time (each letter in alphabet B in which C is written is comprised of d bits). If the primary message P is written in $L_p$ bits such that $L_p$=kd+r, where k and r are positive integers, and 0<r<d, then one cannot achieve $L_c=L_p$. One would resolve this difficulty by making the companion message C longer than the primary message P (by bit count): $L_c>L_p$, and then apply this very message to message P which will be extended in size to be as large as message C ($L_c=L_p$). This can be readily done by building message M" as a sequence of letter $\alpha_1$, which is comprised of $|\alpha_1|$=t bits each. If the values of t and d are such that message size equality cannot be achieved yet, then one generates a longer primary message $L_p>L_c$, and then applies this very procedure to the companion message C. This can be extended to back and forth iteration which will be finite because at some point the length of the two messages (bit count) will be divisible by both d and t: $|L_p|=|L_c|$=k'd=k" t where k' and k" are positive integers.

Obviously, this length matching procedure will be much faster if t=d, or at least t and d have a common divisor larger than one.

If t=1 then a repetition of letter $\alpha_1$ which is 1 bit long can be used as add-on message M" to adjust P to the size of C.

The reader of the message that was extended in this method will simply ignore all the symbols beyond the 'end of message symbol'.

This method can be applied with the "end of message symbol" kept secret, and message M" is written to confuse an unintended reader.

Repeat Last Letter

This method is similar to the above, only that the add on message M" is built by repeating the last symbol of the short message M', as many times as needed to set |M'|=|M|. The reader will simply ignore this repetition. There is an advantage to repeat $\alpha_1$ because it is the shortest.

Full Message Repeat

The short message M' may be repeated in full as many times as necessary to achieve |M'|=|M|. The last repetition may be incomplete (truncated). The reader spotting the repetition will simply ignore them.

Pre-Agreed Void Messages

The communicating parties may pre-agree on statements that are void and are put there as 'place holder' to extend the message bit count. For example, the parties may agree that any statement that contains the word 'rose' is bogus.

Self-Voiding Text

The add on (M") text may be self voiding: like "this statement is void" or "this sentence has no relevant content".

Letter Separation Techniques

Writing a primary message without a companion can be accomplished by using '0' for 'counted bits' that represent letters, and using '1' as the separator symbol.

Let's use t=1 and write a word comprised of letters x, y and z. Let x be represented by 4 bits, y represented by 3 bits, and z represented by 5 bits. The message xyz will be written in P format as:

1000010001000001 and be read without any confusion.

If one wishes to build a P+C message pack and add a companion message then the 4+3+5=12 bits of P ($L_P$=12) cannot remain all zeros but must assume the identities that would let same bits be interpreted as the companion message C. This will require a change for the letter separator.

This requirement can be solved by (i) a third symbol, (ii) space setting, or (iii) double bits.

Third Symbol Solution

The message pack can be written with three symbols: two used for bit identities and one dedicated to letter separator. E.g 0='*', 1='#', separator='%'.

The message xyz above will be written as:

%**%*%*****%

And after writing the companion message C the pack might read:

%*#**%##*%*#**#%

Space Setting

Writing symbols interspersed with spaces. we write 0 as 1, we write 1 as 11, and we write a letter separating symbol as '111, with '0' used as spaces. The above example of the message xyz will be written as:

1110101010101110101010111010101010111

And after writing the companion message C the pack might read:

11101011011010111011011011011101011010110110111

Double Bits

We write message bits by representing 0 as '01' and representing 1 as '10'. We then use '00' as a letter separator, which leaves the combination '11' for other purposes. '11' can be used to identify the start and end of a message.

The message xyz above will be written as:

11010/010/00010101000/01010/0/11

And after writing the companion message C the pack might read:

11011010001010011000011010100111

Cascading Message Packs

A primary message $P_1$ may be accompanied by a companion message $C_1$, to form a message pack {$P_1$-$C_1$}. The result is a binary string $S_1$. $S_1$ may be written as primary message $P_2$, which in turn can be accompanied by a companion message $C_2$, to form a reading pack {$P_2$-$C_2$}. This new reading pack appears as a sequence of bits, to be designated as $S_2$. Now again $S_2$ can be written as a primary message $P_3$, associated with a companion message $C_3$.

This cascading can continue indefinitely. The overall bit counts keep growing.

Cascading applies to the full message including the letter separation symbols.

This creates a situation where the higher up strings come with an ever stronger more credible message because it is harder and harder to fake the result. If each companion message is carried out with a secret key then the security of the overall message can only be violated if all the keys used in construction of the final bit sequence are compromised.

Illustration

We offer several illustrations:

Base64 Primary Language

Any bit string can be represented through Base64, 6 bits at a time. Base64 alphabet is comprised of 64 letters. So for primary expression we can set these 64 letters as string of bits which are of length 1 bit to 64 bits. The average size of a Base64 letter will be 64/2=32 bits. We may choose to represent these bits in the double-bit mode, namely 64 bits per letter. Each letter is terminated by a letter termination symbol, which in the double bit mode is also comprised of 2 bits. So a Baser64 letter written as a primary expression (unary way) is 66=64+2 bits long. In the normal way a Base64 letter is expressed in ASCII, named 8 bits. So primary writing is 66/8=8.25 times longer than standard ASCII. 64 bits of such average letter can be used to write a companion message. If written in ASCII then such primary latter will give room for a companion message of size 64/8=8 characters. In other words, a primary message P will give room for a companion message that writes on the same bits, but may be 8 times longer in terms of normal ASCII letters.

Another illustration:

Let one use a four letter alphabet, X, Y, Z, W to write messages. Using a unary representation one sets: X a string of count 1 bit, Y is represented by a string comprised of 2 bits; Z as a string comprised of 3 bits, and W as a string comprised of 4 bits. The writer wishes to convey a message m that reads as m=XYYXWXZY.

Using the Unary method as above with letter-start symbol, and letter-end symbol both are '*', the writer will compose:

m=*0*00*00*0*0000*0*000*00*

There are 16 letter bits in the message and 9 letter start and letter end symbols. m will be interpreted as m=XYYXWXZY by anyone aware of the mapping of the alphabet {X,Y,Z,W} to unary representation. This interpretation is independent of identities of the 16 letter bits. For example the following string will be interpreted as the same primary message m=XYYXWXZY.

m=*1*10*10*O*0110*1*100*10*

The writer can use the 16 bits to convey a message comprised of 2 ASCII letters. Suppose the writer wishes to state the message "GO". G in ASCII representation is 0100 0111, and O in ASCII representation is 0100 1111. So GO will be written as:

$GO_{ASCII}$=0100 0111 0100 1111

Since m as written before has 16 bits in its letter count bits, it is possible to set the above string written into these 16 bits in m:

m=*0*10*00*1*1101*0*011*11*

This is now a complete message pack. It reads m(primary)=XYYXWXZY. and it reads m(companion)=GO.

If the primary message had consumed 15 letter bits, then the writer could have added the letter X at the end of the primary. Let X represent space, so that m reads the same whether it ends with one space or two spaces. If the writer wishes to have sent a companion message comprised of three ASCII letters, needing 8*3=24 bits then he would have added sufficient number of spaces (the letter X) to m at the end, to get 24 letters bits at his disposal, to write the companion message.

If the companion message is too small, it can also be padded with spaces, or dots, as previously agreed upon.

The writer might wish to use the double bit method to distinguish between the letter bits and the letter-separation symbols (start and end of a primary etter). So the writer might choose to represent 0 in the letter bit as 01, and 1 in the letter bit as 10, and use the combination 00 for both letter start and letter end. In that case the message pack will look like:

m=* 0 * 1 0 * 0 0 * 1 * 1 1 0 1 * 0 * 0 1 1 * 1 1 * m=00 01 00 10 01 00 01 01 00 10 00 10 10 01 10 00 01 00 01 10 10 00 10 10 00

Message Size Consideration

The primary message, is by construction smaller than the companion message. Same content needs more primary bits than companion bits. Therefore it is of some utility to flip the roles of the primary and the companion message. Letting the companion be the 'upfront'—the displayed message, while the shorter, the primary message be the 'back message" where the signature, or the short comment is written.

Since the companion message has more content than the primary it is possible to pack into it more information and varied information, like extra notes, some digital signatures, etc.

Also because of the size differences, it is possible to sign the primary message with a cipher where the size of the ciphertext may be larger, even much larger than the size of the plaintext. As is the case with the cipher described in U.S. Pat. No. 6,823,068.

Message Partition

A primary message P may come with a companion message C. Alternatively, one could break P to two successive messages: $P=P_1+P_2$ (the symbol '+' represents concatenation). Each of the partition messages may be written with its own companion: $P_1 \rightarrow C1$, $P_2 \rightarrow C2$. Depending on how the companion is constructed, we may well have $C1+C2 \neq C$. The choice between these two options, or in general the choice between any partition to another is a matter for consideration based on the circumstances. Division to smaller partitions gives more versatility to companion applications.

Analysis

Message authentication is common, message elaboration too. The respective cryptographic tools incorporate an add-on to the served message. All these add-on messages may be applied using this Cyber Companion method by replacing the add-on as a cyber companion to achieve a stronger integration between the served message and the serving message (the primary and the companion messages). The price of the companion integration is a larger message to be handled. Since text is a small part of overall communication, in comparison with graphics, pictures, video and audio—the price of a 10-times larger text is not too onerous. The size of the primary (displayed) message remains as small as with the common representation The companion message may remain latent and invisible until it is invoked.

Unlike an add-on cryptographic signature, which may be removed, the cyber companion message makes the companion message a necessary present. Let M be a message by writer W. With today's common methods W will sign M and attach signature S to M to prove its authenticity. Yet, S and M can be separated and M may be sent out, communicated and distributed without authentication, with the sender claims for it to be bona fide. Using the cyber companion method writer W will write his signature S as a companion message C=S. The resulting message pack {M-S} will provide authentication to M. One may remove S, but by doing so one will replace S with another companion message C'≠S. A reader will check the companion and receive a positive de-authentication of M because the companion (C') does not authenticate M. Since M is written in a unary fashion, there is always a companion message associated with it, this cannot be avoided. M without a companion cannot be distributed—making the work of fraudsters more difficult.

Since the companion message is larger than the primary, there is room for a variety of attributes and cryptographic products to be written in association with M while keeping the primary message M undisturbed. The cryptographic strength of the cyber companion is exactly the cryptographic strength of the signatures and cryptograms used in other authentication and modification methods. The cyber companion simply puts all these signatures as part of the overall message.

In applications like Tweeter where the primary text is short, but a lot of fake messages are flying around, this built-in companion message authentication is of value. In the future there may be a situation where all tweets, press releases, messages will be expected to be written in this companion method so that each method is either authenticated, or positively de-authenticated, no undecided.

SUMMARY

This invention is summarized as follows:

We apply here for a method to construct a primary-companion message pack as follows: 1. Write a sequence of bits such that the sequence will be interpreted as two distinct messages, one regarded as "primary" (P), and the other regarded as "companion" (C) by using a unary alphabet where the identity of a letter in the used alphabet is recognized by the count of bits in a bit string representing this letter, called 'letter string', where this letter string is bounded by string-start symbol and string-end symbol, and where the identities of the bits in the letter string have no impact on the interpretation of the letter string as to the particular letter it represents, and where no two letters are represented by the same bit-count of their letter string; thereby creating a sequence of letter-string bits, string start symbol, and string end symbol that together interpret as a sequence of letters written in the unary alphabet used herein, such that these letters comprise a message regarded as "primary";

and then setting up the identities of the bits in the letter strings such that the combined sequence of the bits in the sequential letter strings are interpreted as a distinct message, regarded as the 'companion message", which is other than the primary message; thereby constructing a bit sequence that may be interpreted as two distinct messages one regarded as primary and other regarded as 'companion'.

2. This method to construct a primary-companion message pack is augmented into a situation where the companion message modifies the primary message in various possible ways: 1. add-on information: the companion message elaborates on the primary message in contents or in properties like a time stamp, name of the author, level of credibility and veracity of the primary message.

3. This method to construct a message pack is augmented into a situation where the companion message is constructed by encrypting the primary message with the private key of its author, and adding the cryptogram as the companion message; allowing a reader who knows the respective public key of the writer to verify the authenticity of the primary message and its writer by using the public key of the writer over the companion message and verify that the output of this computation is exactly the primary string.

4. This method to construct a primary-companion message pack is augmented into a situation where a writer of a primary message (writer W) will add a companion message to it, by encrypting the primary message with the writer's symmetric secret key, $K_w$, and setting the cryptogram, $C_0$, as a companion message for its primary message, and where the first reader, $R_1$, of the primary message will encrypt the primary message with its symmetric secret key, $K_1$, to compute its companion message $C_1$, which $R_1$ will then XOR with the current companion message to generate an updated companion messages: $C_{01}=C_0 \oplus C_1$, and where the i-th reader, $R_i$, will use his secret symmetric key, $K_i$ to compute the cryptogram ($C_i$) resulting from encrypting the primary message, which $R_i$ will then XOR with the current companion message to update the companion message: $C_{12\ldots i}=C_i \oplus C_{123\ldots(i-1)}$ so that any agent aware of the secret keys $K_w, K_1, \ldots K_i$ will be able to verify from the identity of the current companion message of the primary message ($C_{12\ldots i}$) that the primary message was written by writer W and was read by readers $R_1, R_2, \ldots R_i$.

5. This method to construct a primary-companion message pack is augmented into a situation where the bits in the letter strings will be written with two bits each bit, as follows: bit 0 in the letter string is written as 01, bit 1 in the letter string is written as 10; and where the letter start symbol, and the letter end symbol are both written as 00, and where the primary message will be marked with a message start symbol 11 and a message end symbol 11.

What is claimed is:

1. A method of securely transmitting messages comprising:
   obtaining a message m comprising characters to transmit, wherein the characters include one or more letters;
   generating, by a computing device of a writer W, a primary message from the characters of the message by performing the following:
   (a) generating a series of letter strings from the characters by rewriting the characters from the message m using a unary alphabet to identify a bit count for each letter from the message m, wherein the unary alphabet comprises a group of letters and corresponding bit counts and each letter in m is rewritten as a letter string comprising a bit string with a bit count identified as corresponding to a letter in the unary alphabet, wherein no two letters from the unary alphabet are represented by the same bit count and
   (b) combining each of the letter strings to form a message string as the primary message comprised of letter strings, wherein each letter string is bounded by a letter-string-start symbol and a letter-string-end symbol, and wherein the identities of the bits in one of the letter strings can be changed without changing the identity of the letter in the unary alphabet corresponding to the changed one of the letter strings;
   adding a companion message comprising characters that are transmitted within the identities of the bits of the letter strings in the primary message, wherein the companion message is distinct from the primary message and in particular is generated by encrypting the primary message with a symmetric secret key of the writer W, wherein bits corresponding to a letter of the companion message cannot be changed without changing the letters of the companion message; and
   receiving the primary message and companion message at a computing device of a first reader, wherein the first reader:
      encrypts the primary message with a symmetric secret key of the first reader to generate a companion message for the first reader;
      generates an updated companion message by performing an exclusive OR (XOR) operation between the companion message and the companion message of the first reader; and
      transmits the primary message with the updated companion message to a computing device of a subsequent reader;
   wherein the subsequent reader validates the writer W and the first reader using the secret symmetric key of writer W and the first reader known by the subsequent reader.

2. The method in claim 1, wherein forming the message string further comprises performing the following to each of the letter strings:
   encoding each bit of each letter string with two bits, as follows:
      substituting 01 for every bit with an identity of 0 in each letter string; and
      substituting 10 for every bit with an identity of 1 in each letter string;
   wherein the letter-string start symbol and the letter-string end symbol are both written as 00, and where the primary message will be marked with a message start symbol of 11 and a message end symbol of 11.

* * * * *